Dec. 11, 1928.

C. W. SHERMAN ET AL 1,694,987

SHOCK ABSORBER

Filed Feb. 8, 1927  3 Sheets-Sheet 1

Dec. 11, 1928.

C. W. SHERMAN ET AL 1,694,987

SHOCK ABSORBER

Filed Feb. 8, 1927

3 Sheets-Sheet 2

Clifton W. Sherman  
Joseph M. Hall  
Inventors

By Popp & Powers

Attorneys

Dec. 11, 1928.

C. W. SHERMAN ET AL 1,694,987

SHOCK ABSORBER

Filed Feb. 8, 1927

3 Sheets-Sheet 3

Inventors
Clifton W. Sherman
Joseph M. Hall
By Robert Powers
Attorneys

Patented Dec. 11, 1928.

1,694,987

UNITED STATES PATENT OFFICE.

CLIFTON W. SHERMAN AND JOSEPH M. HALL, OF HAMILTON, ONTARIO, CANADA, ASSIGNORS TO HALL DRAFT GEAR CORPORATION, OF BUFFALO, NEW YORK, A CORPORATION OF NEW YORK.

SHOCK ABSORBER.

Application filed February 8, 1927. Serial No. 166,767.

This invention relates more particularly to a shock absorber of the type containing a plurality of sets of intercalated friction plates, means for moving said sets of plates lengthwise relatively to each other, and means for pressing said plates together transversely for increasing the frictional contact between the same and the resistance effect while the sets of plates are moved longitudinally inward relatively to each other, this transverse pressure being relieved when the longitudinal inward pressure is relaxed, thus permitting of subsequently moving the sets of friction plates lengthwise outwardly relatively to each other with comparative freedom.

The object of this invention is to avoid buckling of the friction plates, to guide and hold the same in alinement relative to each other during longitudinal movement thereof, and also to provide superior means for taking over solid loads. The first of these objects is accomplished by making the plates of curved or substantially channel shaped form in cross section which not only stiffens the plates and enables the same to withstand comparatively heavy endwise pressure but also guides the same lengthwise upon one another. The second of these objects is accomplished by dividing the plates into two groups and arranging an oversolid post between these two groups and providing the same with surfaces corresponding to those of the plates.

Figure 1:
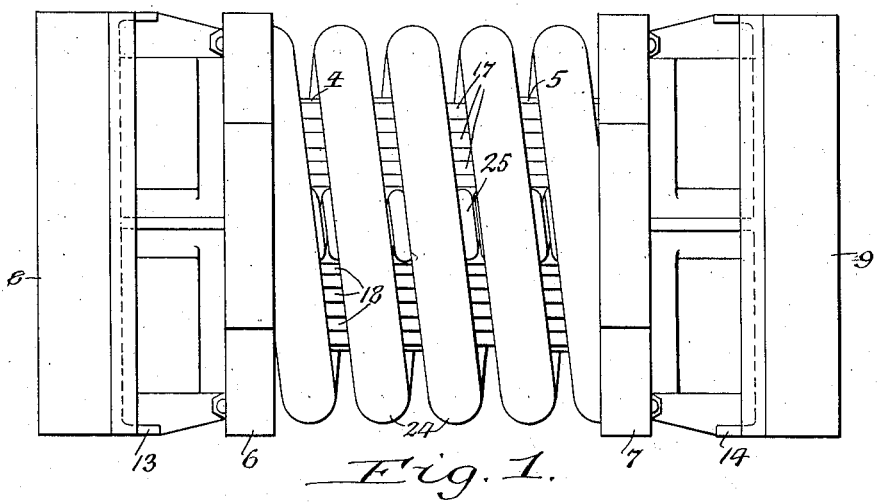
Figure 2:
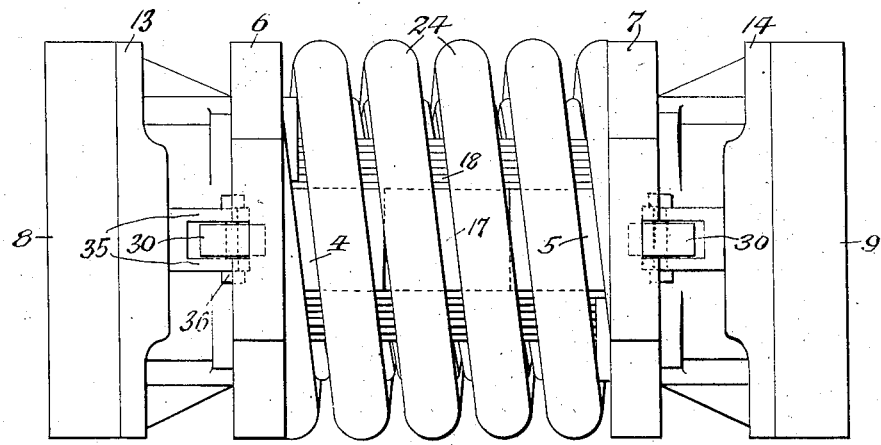
Figure 3:
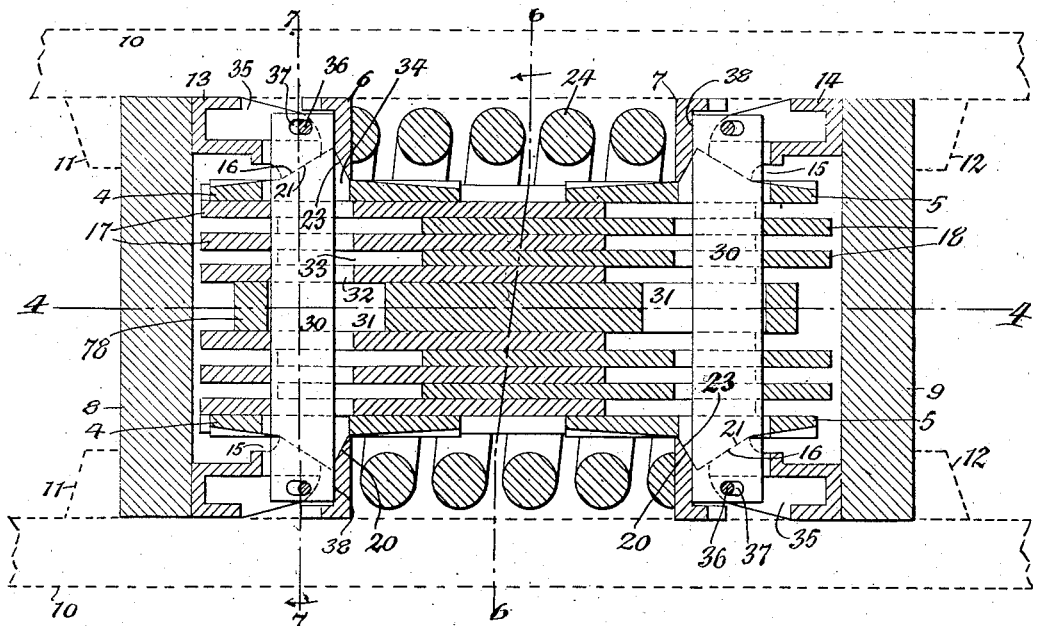
Figure 4:
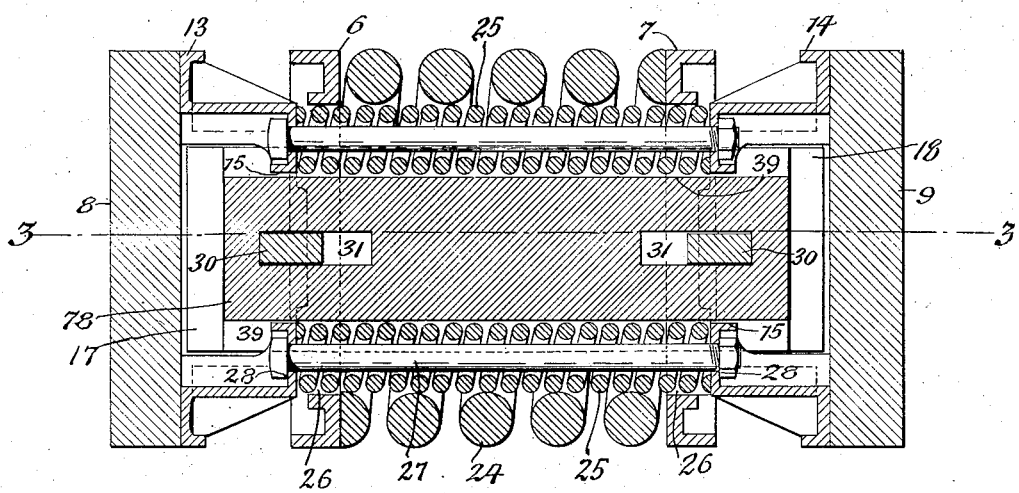
Figure 5:
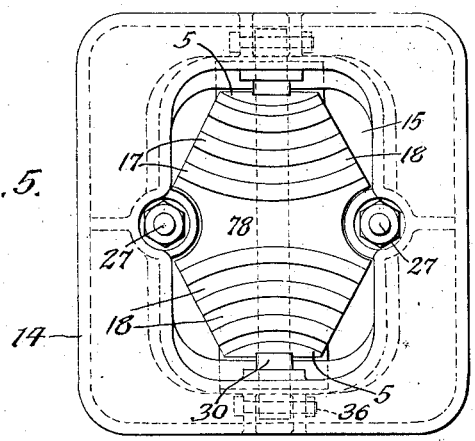
Figure 8:
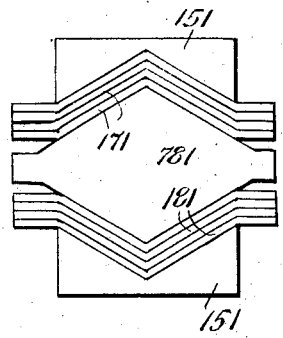
Figure 6:
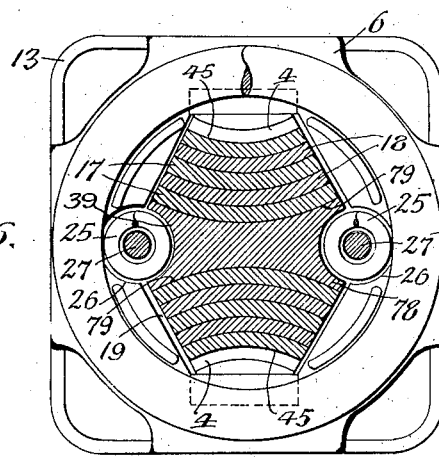
Figure 9:
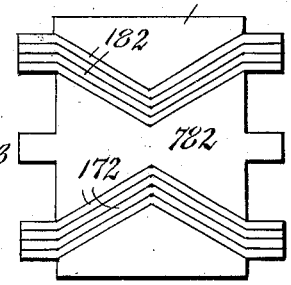
Figure 7:
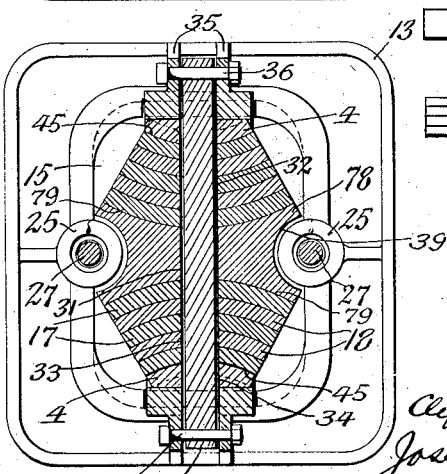

In the accompanying drawings:

Figure 1 is a side elevation of this improved shock absorber. Figure 2 is a top plan view of the same. Figure 3 is a vertical section of the shock absorber embodying our improvements taken on line 3—3, Fig. 4. Figure 4 is a horizontal longitudinal section of the same taken on line 4—4 Fig. 3. Figure 5 is an end elevation of the shock absorber. Figures 6 and 7 are vertical transverse sections of the same taken on the correspondingly numbered lines in Fig. 3. Figures 8 and 9 are end elevations of two groups of intercalated friction plates arranged on opposite sides of central oversolid posts and between pairs of shoes showing modified forms in cross section of these members.

Similar characters of reference indicate like parts in the several figures of the drawings.

It is customary in shock absorbers of this type to mount the same lengthwise between two main or outer followers 8, 9, which are arranged transversely relatively to the line of pulling and pushing or buffing strains to which the car is subjected when coupling adjacent cars or when drawing a train of cars. For this purpose these main followers together with the shock absorber between them, are mounted between longitudinal sills 10, 10 of the car frame and the outer sides of the followers engage with transverse stops 11, 11, 12, 12, on these sills.

It will be assumed that the follower 8 is at the front and the follower 9 at the rear of the absorber when the same is installed so that during a buffing action on the shock absorber the front follower 8 will be moved inwardly away from its stops 11, 11 while the rear follower 9 will be held stationary, and during a pulling action on the shock absorber the front follower 8 will remain at rest while the rear follower 9 is moved inwardly by the load upon the same.

In its general organization the shock absorber which embodies our improvements is constructed as follows:

The numerals 13, 14 represent outer or main thrust heads which engage with their outer sides against the inner sides, respectively, of the front and rear followers and each of which is provided with a central opening 15 so that each of these heads has the form of a frame. On the opposite sides of the inner edge of this central opening of each outer thrust head the same has inclined faces 16, 16, which diverge inwardly by dotted lines, as shown in Fig. 3.

Between the sills is arranged a column of friction plates which includes two sets of intercalated friction plates 17, 18, which for convenience may be termed front and rear sets; the outer parts of the front set 17 being arranged within the opening 15 in the front main thrust head 13 and the outer parts of the rear set 18 being arranged within the central opening of the rear outer or main thrust head.

Adjacent to the inner sides of the outer thrust heads are two inner thrust heads or spring seats 6, 7, each of which has a central opening 19 receiving the adjacent parts of the friction plates, and provided on opposite sides of its central opening with inclined faces 20, which diverge outwardly and are preferably arranged opposite the inclined faces 16 of the outer thrust heads, as shown in Fig. 3.

The friction plates in both sets are arranged in two groups on opposite sides of the longitudinal center of the absorber and between the two groups is arranged a comparatively thick or heavy longitudinal oversolid post or core 78.

Arranged within the central openings of the thrust heads are friction wedge shoes 4 and 5 a pair of which engage their inner longitudinal sides with the transversely opposite outer sides of the two friction plates of both sets adjacent to opposite ends thereof. On its outer longitudinal side each of the wedge shoes is provided with a transverse rib having an inclined outer face 21 engaging with the respective inclined face 16 of the adjacent outer thrust head and an inclined inner face 23 engaging with the respective inclined face 20 of the adjacent inner thrust head, so that the outer inclined faces of each pair of wedge shoes converge outwardly and the inner inclined faces of the same converge inwardly.

The numeral 24 represents a main thrust spring which is preferably comparatively heavy and of helical form and surrounds the central parts of the friction plates and the inner ends of the wedge shoes and bears at its opposite ends against the inner sides of the inner thrust heads. On opposite sides of the friction plates and oversolid post and within the main thrust spring are two auxiliary release springs 25 which are of helical form and pass with their end portions through side openings 26 in the inner thrust head and bear at their opposite ends against the inner sides of the two outer thrust heads, as shown in Fig. 4.

Undue separation of the outer thrust heads is prevented, when the gear is removed from the car, by tie rods 27 extending through the release springs and inner and outer thrust heads, and provided with inwardly facing shoulders 28 bearing against the outer sides of the outer thrust heads.

For the purpose of increasing the stiffness of the friction plates 17, 18, each of these plates is curved crosswise with its convex side facing inwardly and its concave side facing outwardly, as shown in Figs. 5, 6, and 7. In order to permit the central post or core 78 to bear uniformly against the friction plates on opposite sides thereof this central post is provided on its opposite sides with transversely curved concave faces 79 which conform to those of the adjacent plates 17, 18, and fit the same. For the same reason the inner or bearing sides of the wedge shoes 4, 5, are provided with transversely curved convex faces 45 which correspond in contour to the opposing concave faces of the outermost friction plates and engage therewith, as shown in Figs. 5, 6, and 7.

The length of the side and central friction plates 17, 18 and 78 is slightly less than the space between the followers 8, 9 when the latter are in the fully closed position under the maximum pushing or pulling load to which the car may be subjected thereby preventing these plates from taking the oversolid load, but the oversolid post or core is equal in length to the predetermined space between the followers in their fully closed position, thereby causing the oversolid post to receive the oversolid load and limit the movement of the followers toward one another.

The numeral 30 represents releasing bars each of which extends transversely through an opening 31 in one end of the oversolid post, closed slots 32 in the outer ends of the corresponding set of friction plates, open slots 33 in the inner ends of the other set of friction plates and closed slots 34 in the adjacent pair of wedge shoes. At its opposite ends each releasing bar is arranged between pairs of lugs 35 on the adjacent outer thrust head and is loosely coupled with said head by transverse coupling bolts 36 each passing through a pair of said lugs 35 and a longitudinal slot 37 in the adjacent end of the respective releasing bar. Each releasing bar engages with its inner side at opposite ends thereof against outwardly facing shoulders 38 on the adjacent inner thrust head or spring seat, as shown in Fig. 3. The releasing springs are preferably arranged in longitudinal channels 39 arranged in opposite longitudinal edges of the oversolid post, as shown in Figs. 5, 6 and 7, thereby obtaining a compact structure. The two groups of friction plates on opposite sides are preferably made progressively narrower from the oversolid post outwardly so that each group forms a laterally tapering or V-shaped pile, whereby the maximum strength and friction surface is obtained for a given amount of metal.

By thus curving the friction plates crosswise they are not only materially stiffened and present a greater surface for engagement with each other to increase the frictional resistance against longitudinal movement relatively to each other but these curved faces also serve to guide the plates upon each other and positively prevent lateral displacement so that a uniform operation of the gear is obtained.

The operation of the shock absorber is as follows:

Preparatory to placing the absorber in its operative position as part of the draft rigging between the front and rear stops of the car sills and connecting the same with the coupler yoke or similar actuating means, the springs of the absorber are put under an initial compression, as shown in Figs. 1, 2, 3 and 4, where the followers are represented in the maximum separated condition.

If a buffing or pulling force is applied to either of the followers 8, 9, sufficient to overcome the initial resistance of the draft gear caused by the initial compression on the release springs 25 bearing direct on the thrust heads 13 and 14 and the frictional resistance set up by the action of the main thrust spring 24 acting inwardly on the wedge shoes 4 and 5, the latter are caused to slide on the outermost friction plates at both ends of the draft gear until the followers 8, 9, are brought into engagement with the outer ends of the friction plates 17, 18.

The advance of the moving follower and moving outer thrust head, and the wedge action due to the engagement of the inclined faces of the thrust heads with the outer inclines on the companion wedge shoes causes the latter to be pressed transversely inwardly thereby increasing the frictional engagement of the several intercalated plates, and also increasing the frictional resisting capacity of these plates against moving one set of these plates inwardly relative to the other set. At the period of closing the draft gear the compression of the release springs 25 is increased as well as the compression of the main or thrust spring 24.

Immediately after the followers 8, 9, are forced into contact with the ends of the side friction plates 17, 18, the intercalated friction plates are forced to slide inwardly one set relatively to the other, the set at one end being held stationary while the set at the other end is forced toward the stationary set, at which time the resistance to the sliding of the friction plates upon each other absorbs the shock or blow with increasing capacity due to the increasing wedging action set up by compressing the main spring 24. During the initial part of the inward movement of each follower the adjacent releasing bar is moved inwardly independently of the respective friction plates and away from the outer ends of the slots 32 therein.

When the load on the shock absorber is relieved to such an extent so as to allow the release springs 25 to force the outer thrust heads 13, 14, apart the action is as follows:

First, the release springs 25 separate the outer or main thrust heads 13, 14, which tends to relieve the wedging action on the shoes 4, 5. The pressure of the main spring 24, which is under compression, forces the inner thrust heads or spring seats 6 and 7 against the shoes 4 and 5 tending to hold the seats and shoes in wedging engagement until the releasing bars are forced into contact with the outer ends of the slots 32 in the friction plates. The pressure of the main spring 24 is then divided for producing a wedging action on the wedge shoes and a retractive action on the friction plates, at which time the release springs 25 tend to force the outer or main thrust heads 13, 14 out of wedging engagement with the wedge shoes.

The releasing bars engage the shoulders formed by the inner ends of the slots 32 in the friction plates after sufficient outward movement is gained to relieve the wedging action, any excess capacity in the release springs 25 being transferred to the friction plates so as to act upon them in the direction for retracting them to their outer position in which the gear is in release.

By passing the releasing bars through slots in the oversolid post the latter is limited in its longitudinal movement and returned by these bars to a position midway between the followers when the gear is released, thereby forming a uniform support for the two groups of friction plates on opposite sides of the same. This action is due to engagement of the releasing bars with the outer ends of the slots in the oversolid post when the gear is in its fully opened or released position, as shown in Figs. 3 and 4.

If, for any reason the friction plates should become stuck and not move outwardly to their fullest extent under the pressure of the main spring which is transmitted to the plates through the medium of the spring seats and releasing bars, then the resilience of the releasing springs is added to that of the main spring resistance, this releasing spring pressure being transmitted to the friction plates through the medium of the main thrust heads, the bolts 36 and the releasing bars, thereby ensuring return of the friction plates to their initial position after each shock absorbing operation.

By placing the oversolid post in the longitudinal center of the shock absorber the thrust of the load delivered against the same by the car coupler will be transmitted directly through the center of the absorber when an oversolid condition is reached thereby relieving all other parts of the absorber of any oversolid strains and preventing the same from being distorted which otherwise might cause the absorber to function less efficiently.

If in the course of time the ends of the oversolid post should become upset by repeated blows of the followers, the same ultimately are reduced in length equal to the length of the friction plates and thereafter the post and plates together take the oversolid loads.

Instead of making the cooperating surfaces of the plates, shoes and post of curved form in cross section, these plates may be made of V-shaped or channel form in cross section and the cooperating surfaces of the post and shoes of corresponding shape. As shown in Fig. 8 each of these V-shaped plates 171, 181 has its convex side facing outwardly and the faces of the post 781 between the same are of convex form while the faces of the shoes 151 have inner bearing faces of concave form. In Fig. 9 the friction plates 172, 182 of V-form in cross section have their convex surfaces facing inwardly and engaging convex V-shaped faces on opposite sides of the post 782 and the concave outer faces of these plates are engaged by the concave inner faces of the shoes 152.

We claim as our invention:

1. A shock absorber comprising a plurality of intercalated friction plates which are adapted to slide lengthwise relatively to one another, and each plate being of curved form in cross section and engaging its convex and concave sides with corresponding concave and convex sides of adjacent plates, means for effecting relative longitudinal movement of said plates, means for pressing said plates laterally against each other, and a spring resistance.

2. A shock absorber comprising a plurality of intercalated friction plates which are adapted to slide lengthwise relatively to one another, and each plate being of curved form in cross section and engaging its convex and concave sides with corresponding concave and convex sides of adjacent plates, means for effecting relative longitudinal movement of said plates, means for pressing said plates laterally against each other, and a spring resistance, said plates comprising two groups arranged on opposite sides of the longitudinal center of the absorber and the plates of each group being progressively narrower from the center of the absorber toward the side thereof.

3. A shock absorber comprising two relatively movable followers, a central longitudinal oversolid post arranged between said followers and adapted to be engaged at opposite ends by said followers, two groups of intercalated friction plates arranged on opposite sides of said post and each group consisting of two sets of plates which are movable lengthwise relatively to one another, said sets of plates adapted to be engaged at their outer ends with said followers, respectively, shoes engaging with the outermost friction plates, said post having its opposite sides curved crosswise, said shoes having their inner sides curved crosswise and said friction plates being of curved form in cross section and having their mating sides engaging with each other and with the curved surfaces of said post and shoes, means for pressing said shoes laterally, means for moving said plates lengthwise, and a spring resistance.

4. A shock absorber comprising two relatively movable followers, a central longitudinal oversolid post arranged between said followers and adapted to be engaged at opposite ends by said followers, two groups of intercalated friction plates arranged on opposite sides of said post and each group consisting of two sets of plates which are movable lengthwise relatively to one another, said sets of plates adapted to be engaged at their outer ends with said followers, respectively, shoes engaging with the outermost friction plates, releasing spring means interposed between said followers, said post being provided on its opposite sides with channels which receive said releasing spring means, means for pressing said shoes laterally against said plates, and a main spring resistance.

5. A shock absorber comprising two relatively movable followers, a plurality of sets of intercalated friction plates arranged between said followers and adapted to slide lengthwise relatively to one another and to be engaged at their outer ends by said followers, respectively, said plates being provided at their outer ends with longitudinal slots, shoes engaging with the sides of said plates and having longitudinal slots, releasing bars each passing through the slots of one set of friction plates and the corresponding shoes, outer thrust heads movable with said followers and having wedging engagement with said shoes, inner thrust heads adapted to engage outwardly with said releasing bars, and having wedging engagement with said shoes, a main spring resistance interposed between said inner thrust heads, and a releasing spring resistance interposed between said outer thrust heads.

6. A shock absorber comprising two relatively movable followers, a plurality of sets of intercalated friction plates arranged between said followers and adapted to slide lengthwise relatively to one another and to be engaged at their outer ends by said followers, respectively, said plates being provided at their outer ends with longitudinal slots, shoes engaging with the sides of said plates and having longitudinal slots, releasing bars each passing through the slots of one set of friction plates and the corresponding shoes, outer thrust heads movable with said followers and having wedging engagement with said shoes, inner thrust heads adapted to engage outwardly with said releasing bars and having wedging engagement with said shoes, a main spring resistance interposed between said inner thrust heads, a releasing spring resistance interposed between said outer thrust heads, and means for coupling said releasing bars with said outer thrust heads.

7. A shock absorber comprising two relatively movable followers, a plurality of sets of intercalated friction plates arranged between said followers and adapted to slide lengthwise relatively to one another and to be engaged at their outer ends by said followers, respectively, said plates being provided at their outer ends with longitudinal slots, shoes engaging with the sides of said plates and having longitudinal slots, releasing bars each passing through the slots of one set of friction plates and the corresponding shoes, outer thrust heads movable with said followers and having wedging engagement with said shoes, inner thrust heads adapted to engage outwardly with said releasing bars and having wedging engagement with said shoes, a main spring resistance interposed between said inner thrust heads, a releasing spring resistance interposed between said outer thrust heads, and means for coupling said releasing bars with said outer thrust heads, comprising bolts mounted on said outer thrust heads and passing through the opposite ends of said releasing bars.

8. A shock absorber comprising two relatively movable followers, a plurality of sets of intercalated friction plates arranged between said followers and adapted to slide lengthwise relatively to one another and to be engaged at their outer ends by said followers, respectively, said plates being provided at their outer ends with longitudinal slots, shoes engaging with the sides of said plates and having longitudinal slots, releasing bars each passing through the slots of one set of friction plates and the corresponding shoes, outer thrust heads movable with said followers and having wedging engagement with said shoes, inner thrust heads adapted to engage outwardly with said releasing bars and having wedging engagement with said shoes, a main spring resistance interposed between said inner thrust heads, a releasing spring resistance interposed between said outer thrust heads, said releasing bars being provided at their outer end with slots, said outer thrust heads being provided with pairs of lugs which receive between them the outer ends of said releasing bars, and coupling bolts mounted on said lugs and passing through said slots of the releasing bars.

9. A shock absorber comprising two relatively movable followers, an oversolid post arranged lengthwise between said followers and along the longitudinal center of the absorber and adapted to be engaged at its opposite ends by said followers, two groups of friction plates arranged on opposite sides of said post and each group consisting of two sets of intercalated friction plates, one set adapted to be engaged at its outer end by one of said followers and the other set adapted to be engaged at its outer end by the other follower, means for moving said friction plates lengthwise inwardly relatively to each other during a lengthwise compression load on the absorber and to move said plates outwardly after the compression load ceases, means for creating a transverse pressure on said plates during inward longitudinal movement of the same and to relieve said transverse pressure when the lengthwise compression load ceases, and a spring resistance.

10. A shock absorber comprising a plurality of intercalated friction plates which are adapted to slide lengthwise relatively to one another and each of which has its central part deflected relative to the longitudinal edge portions thereof, means for effecting relative longitudinal movement of said plates and means for laterally pressing said plates together and releasing the same.

11. A shock absorber comprising a plurality of intercalated friction plates which are adapted to slide lengthwise relatively to one another and each of which has its central part deflected relative to the longitudinal edge portions thereof, means for effecting relative longitudinal movement of said plates, means for laterally pressing said plates together and releasing the same, and a spring resistance.

12. A shock absorber comprising a plurality of intercalated friction plates which are adapted to slide lengthwise relatively to one another and each of which has its central part deflected relative to the longitudinal edge portions thereof, means for effecting relative longitudinal movement of said plates, means for laterally pressing said plates together and releasing the same, including shoes which have bearing surfaces engaging with said plates and which are of corresponding form in cross section.

13. A shock absorber comprising a central longitudinal oversolid post, groups of intercalated friction plates arranged on opposite sides of said post, means for moving said plates lengthwise relatively to each other, and means for laterally pressing said plates and post together and releasing the same.

14. A shock absorber comprising a central longitudinal oversolid post, groups of intercalated friction plates arranged on opposite sides of said post, means for moving said plates lengthwise relatively to each other, means for laterally pressing said plates and post together and releasing the same including shoes engaging the outer sides of said groups of plates, the cooperating surfaces of plates, post and shoes being of non-flat form.

15. A shock absorber comprising a central longitudinal oversolid post, groups of intercalated friction plates arranged on opposite sides of said post, means for moving said plates lengthwise relatively to each other, means for laterally pressing said plates and post together and releasing the same, including shoes engaging the outer sides of said groups of plates, the cooperating surfaces of plates, post and shoes being of non-flat form, and a spring resistance.

In testimony whereof we hereby affix our signatures.

CLIFTON W. SHERMAN.
JOSEPH M. HALL.